July 30, 1957 E. F. MARTINO ET AL 2,801,382
SIGNAL AMPLIFYING AND MODULATING APPARATUS
Filed May 16, 1955
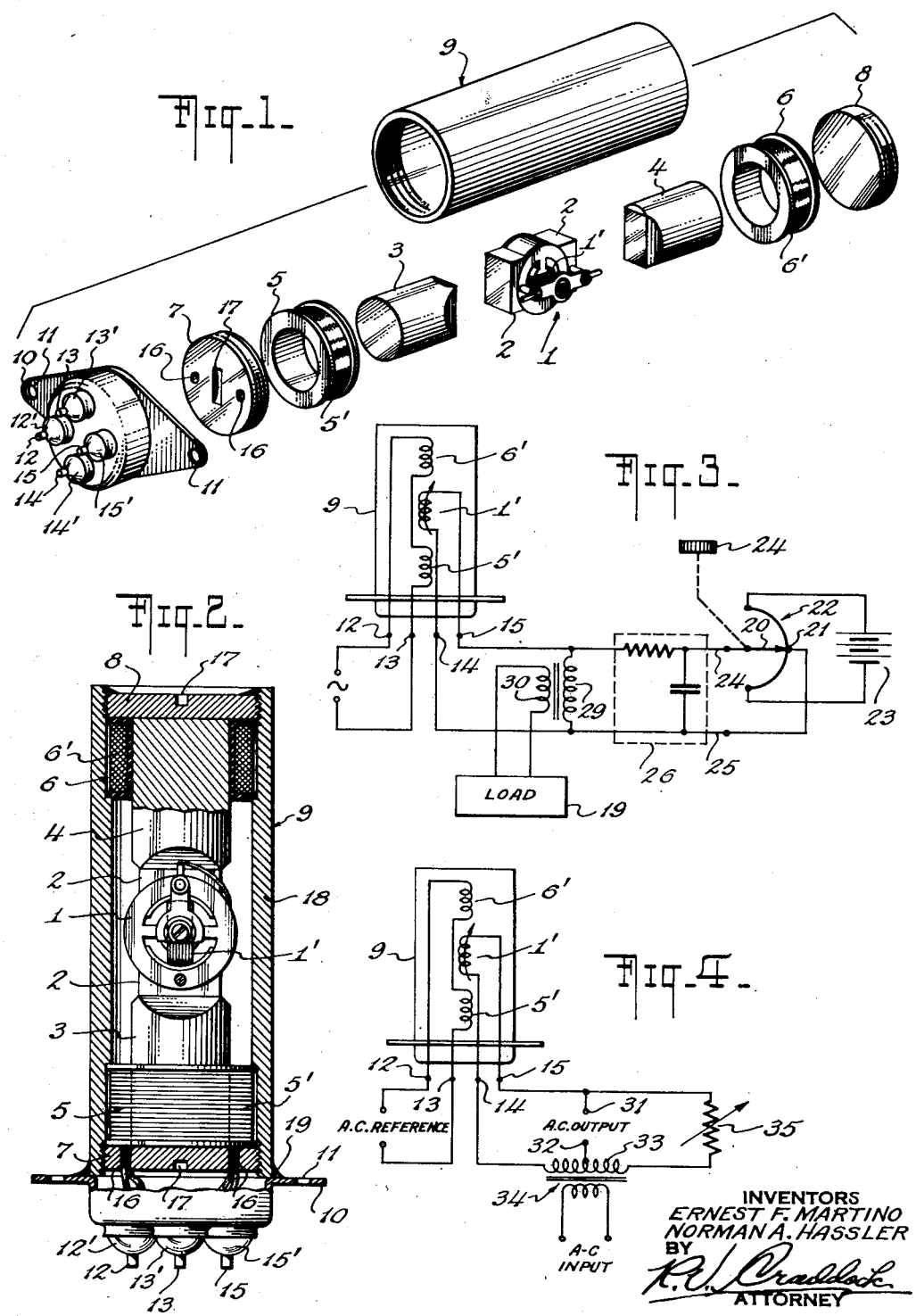
INVENTORS
ERNEST F. MARTINO
NORMAN A. HASSLER
BY
ATTORNEY

United States Patent Office 2,801,382
Patented July 30, 1957

2,801,382

SIGNAL AMPLIFYING AND MODULATING APPARATUS

Ernest F. Martino, Woodside, and Norman A. Hassler, Bedford Hills, N. Y., assignors to Sperry Rand Corporation, a corporation of Delaware Application May 16, 1955, Serial No. 508,712

7 Claims. (Cl. 323—52)

This invention relates to signal amplifying and modulating apparatus, and particularly to improvements in galvanometer-type apparatus of this character.

A galvanometer-type amplifier-modulator is described in U. S. Patent 2,486,641, issued November 1, 1949, in the name of Roswell W. Gilbert. The patented device comprises a sensitive direct-current galvanometer having, in addition to the usual horseshoe-like permanent magnet and D.-C. excited pivotal coil, stationary coil means excited by an alternating-current for introducing a ripple component into the permanent magnet field flux. When the coil is deflected from a zero position by direct current, an alternating current component proportional to the deflection angle and varying in phase with the direction of the displacement is induced in the moving coil. The induced alternating-current voltage is then introduced into a load circuit via a transformer coupling between the load circuit and the moving coil circuit.

The present invention is concerned with an apparatus that operates on the general principle of the patented device, but which incorporates novel constructional features which render it particularly well-suited to be used in plural numbers in data transmission systems where a plurality of low level D.-C. signals must be converted with high power gains to proportional A.-C. signals. In this regard, the improved structure is exceptionally compact in size and light in weight. Moreover, the structure is such as to facilitate ease of manufacture and assembly. Further, by the novel structure of the apparatus, a complete shielding of delicate meter parts from environmental dust and stray magnetic fields is obtained. Also, the structure is such as to enable the ready mounting of the apparatus on the radio-like chassis usually employed for electronic components in data transmission systems, a feature of the apparatus in this respect being that it has a mounting base having terminal pins integral therewith by which electrical input and output connections may be made internally of the apparatus to current supply sources and a load external of the apparatus.

Further features of the invention will become apparent from the following detailed description thereof when read in view of the accompanying drawings, wherein:

Fig. 1 is an exploded view of the novel apparatus;
Fig. 2 is a side view, partly in section, of the apparatus when assembled; and
Figs. 3 and 4 are schematic wiring diagrams of the apparatus in respective illustrative control systems.

Referring to the exploded view shown in Fig. 1, the present novel apparatus comprises a conventional D'Arsonval meter movement 1 including a pivotal coil 1' mounted on suitable supporting blocks 2 for rotation in an air-gap formed therebetween, a coaxial pair of identical bar magnets 3, 4 on respectively opposite sides of movement 1 with poles facing each other of opposite polarity, a pair of identical cylindrical coil-wound spools 5, 6 adapted to slip over the respective magnets, a pair of peripherally threaded cylindrical end-caps 7, 8 for sealing the meter movement along with the bar magnets and spools in a hollow cylindrical housing 9 having ends that are internally threaded to receive the end-caps, and a base member 10 for mounting the housing and its contents on a chassis or the like by means of drilled holes 11 and for supporting two pairs of terminal pins 12, 13 and 14, 15 projecting away from the housing and electrically connected internally of the housing to the coils 5', 6' on spools 5, 6 (terminals pair 12, 13) and to the moving coil of meter movement 1 (terminal pair 14, 15). Base 10 is preferably metallic, and pins 12–15 are preferably set in glass buttons 12'–15' for sealing and insulating purposes. End-cap 7 is provided with drilled holes 16 to accommodate insulated leads (hereinafter shown in Fig. 3) for connecting the respective terminal pairs to the fixed and moving coils. Both end-caps are preferably supplied with a centrally-located shallow screwdriver slot 17 for assembly purposes.

Housing 9 and end-caps 7, 8 are made of a highly paramagnetic or permeable material so that together they may form a low reluctance magnetic path from the outer pole-face of one bar magnet to the outer pole-face of the other, as will become apparent by reference to the side view of the assembled apparatus depicted in Fig. 2.

Referring now to Fig. 2, the meter movement is positioned between magnets 3, 4 so that the axis of rotation of its moving coil is substantially perpendicular to the common axis of the magnets. Coil-wound spools 5, 6 fit snugly over magnets 3, 4 and preferably have an axial length less than that of the magnets. Cylindrical housing 9 has an axial length that insures that end-caps 7, 8 when screwed into place will securely press the opposite pole-faces of magnets 3, 4 against opposite sides of the supporting blocks 2 for meter movement 1. The bore of housing 9 is substantially the same diameter near its ends as the spools 5, 6 so that the spools fit snugly therein. A reduced diameter central portion 18 in housing 9, however, may be employed to substantially prevent any axial movement of the spools once the end-caps are in place.

The assembly of the apparatus is completed by the fastening of the mounting and terminal base 10, with its internal electrical connections made, to the end of housing 9 having end-cap 7. It is immaterial how the fastening is accomplished, but for illustrative purposes it is shown in Fig. 2 as being by means of solder forming a fillet 19 at the juncture of base 10 and housing 9.

Coils 5', 6' on spools 5, 6 are electrically connected within the apparatus so that when excited by an alternating current, they superimpose an alternating magnetic field in the air gap on the permanent magnetic field produced in the gap by magnets 3, 4.

Fig. 3 shows how the apparatus of Figs. 1 and 2 may be employed to energize a load 19 with alternating current that varies in magnitude and phase with the variations in magnitude and polarity of a direct current supplied to the pivotal or moving coil 1' of meter movement 1. The variable direct current is obtained across the wiper 20 and center-tap 21 of a potentiometer 22 energized from a battery 23. A manually-operated knob 24 is mechanically connected to position wiper 20 so that when the wiper is moved to one side of center-tap 21, a D.-C. potential of one polarity is obtained, a D.-C. potential of opposite polarity being obtained when the wiper is moved to the other side. In each case, the distance through which the wiper is moved from the center-tap determines the magnitude of the D.-C. potential across the wiper and center-tap.

The wiper and center-tap of potentiometer 22 are respectively connected by a pair of leads 24, 25 to a filter 26, thence to terminals 15, 14 for energizing moving coil 1' in accordance with the D.-C. potential developed on the leads.

The modulating potential for the instrument is applied across a pair of A.-C. input terminals 27, 28 connected, respectively to terminals 12, 13 for energizing the electrically-connected fixed coils 5', 6'. For illustrative purposes, these coils are depicted as being series-connected; however, it is obvious that they may be parallel-connected if desired, since the only matter of importance in their connection is that they cooperate, when energized, to produce an alternating magnetic field in the space occupied by moving coil 1'.

Depending on which direction knob 24 is turned, moving coil 1' is deflected clockwise or counterclockwise. The alternating field produced by coils 5', 6' induces an alternating potential in coil 1' of phase and magnitude according to the deflection sense and amount of coil 1'. This potential is employed to excite a transformer primary winding 29 connected across terminals 14, 15 on the modulator side of filter 26. The secondary winding 30 associated with winding 29 is connected to load 19, thereby to provide the desired A.-C. input to the load from the novel modulator. Filter 26 may be of any suitable type for isolating the D.-C. source from the induced A.-C.; hence may, for example, comprise an R–C network.

Besides its use, as shown in Fig. 3, as a modulator and amplifier of direct current signal inputs, the apparatus of Figs. 1 and 2 may be employed to provide an amplified and lagging version of an alternating current signal fed as the input to its moving coil. An arrangement illustrating this use is depicted in Fig. 4, wherein terminals 12, 13 are again connected to A.-C. supply terminals 27, 28 for producing an alternating magnetic field in the space occupied by moving coil 1', but wherein coil 1' is connected in a two-arm network which is balanced when coil 1' is in its position of zero induced voltage. One arm of the network is connected between a pair of output terminals 31, 32 and is formed by coil 1' in series with half of the center-tapped secondary winding 33 of a signal input transformer 34, while the other arm is connected between terminals 31, 32 and is formed by an adjustable resistor 35 in series with the other half of secondary winding 33. Resistor 35 is provided for balancing the network when coil 1' is in its position of zero induced voltage.

By this arrangement, any input signal connected to energize the primary winding of input transformer 34 and in time phase with the alternating flux produced by coils 5', 6' causes a deflection of coil 1' proportional to the input current and the alternating flux. Upon coil 1' being deflected, a voltage is induced therein which unbalances the network, thereby to produce a voltage across output terminals 31, 32 which is proportional to the input signal, but which has a power gain and lags the input signal by the time constant of the moving coil mechanism. In this instance, the permanent magnets are used for damping purposes only.

Since a number of changes may be made to the apparatus described above without departing from the scope of the invention, it is intended that all matter contained in the above description, or shown in the accompanying drawings shall be interpreted as illustrative and not in a limiting sense.

What is claimed is:

1. A galvanometer-type amplifier-modulator comprising a spaced pair of coaxially-disposed, longitudinally-extending permanent magnets having poles of opposite polarity abutting the gap between said magnets for providing a unidirectional magnetic field in said gap, a coil element rotatably supported in said gap and field, said coil element being rotationally responsive to direct current energization thereof, first and second coil wound spools respectively fitted over said magnets, the coils on said spools being arranged to add an alternating magnetic field to said unidirectional magnetic field in said gap when jointly excited by an alternating current, an open-ended hollow cylindrical member of permeable material coaxial with said magnets and arranged to form a housing for said magnets, said spools, and said rotatable coil element, and first and second end-caps of permeable material for sealing the open ends of said hollow member, said end-caps having inner surfaces respectively contacting said magnets at the ends of said magnets remote from said gap so as to provide a low reluctance magnetic path via said end-caps and housing between said remote ends of said magnets.

2. The amplifier-modulator of claim 1 further comprising a base member secured to one of the end-caps for mounting said amplifier-modulator, said base member including first and second pairs of outwardly projecting terminal pins electrically connected internally of said amplifier-modulator respectively in circuit with the rotatable coil assembly and the coils wound on the spools fitted over the magnets.

3. A meter-like modulator apparatus comprising a spaced pair of coaxially-disposed, longitudinally-extending permanent magnets having poles of opposite polarity abutting the gap between said magnets for providing a unidirectional magnetic field in said gap, a coil element rotatably supported in said gap and field, said coil element being rotationally responsive to direct current energization thereof, fixed first and second electrically-connected coils wound respectively around said magnets for superimposing an alternating magnetic field on said unidirectional magnetic field in said gap when said fixed coils are excited by an alternating current, a cannister-like member of permeable material for enclosing said magnets, fixed coils, and rotatable coil element, said cannister-like member contacting the respective magnets only at the magnet ends remote from said gap thereby to provide a low reluctance magnetic path between said magnet ends via said member, and means for making electrical connections to said rotatable coil element and said fixed coils from without said apparatus.

4. The apparatus of claim 3 wherein the cannister-like member has a pair of opposed planar surfaces arranged to bear respectively against the remote ends of the magnets, thereby to provide the low reluctance path between said remote ends via said member.

5. A galvanometer device comprising a cannister-like member of highly permeable material having a pair of opposed end surfaces, first and second permanent bar magnets coaxially mounted within said member, said first bar magnet contacting at its north polarity end one of said opposed end surfaces and said second bar magnet contacting at its south polarity end the other of said opposed end surfaces, said bar magnets and said cannister-like member being of such length that an air gap is formed between the south polarity end of said first bar magnet and the north polarity end of said second bar magnet, a coil pivotally supported in said air gap for angular displacement in accordance with such direct current that may be supplied to said coil, fixed first and second electrically-connected coils wound respectively around said first and second bar magnets for superimposing an alternating magnetic field in said air gap upon the permanent magnetic field produced therein by said magnets if said fixed coils should be excited by an alternating current, and means for making electrical connections to said pivotally supported coil and said fixed coils from without said device, whereby said direct current may be supplied to said pivotally supported coil and said alternating current may be supplied to said fixed coils.

6. A galvanometer-like apparatus comprising a hollow member of paramagnetic material provided with at least one opening to its hollow portion to receive a plurality of components for mounting internally of said member, a flux-directing element forming a first of said components and partially occupying said hollow portion, one of said hollow member and said flux-directing element being magnetized to produce a steady axially-directed magnetic flux traversing a part of said hollow portion not occupied by said flux-directing element, a deflectable coil forming a second of said components and mounted for movement in said part of said hollow portion, a fixed coil forming a third of said components, said fixed coil being so constructed and arranged that upon electrical energization thereof it produces a magnetic flux in superimposed direct alignment with said steady flux according to said energization, paramagnetic closure means for sealing said opening and providing a low reluctance connection between said hollow member and said flux-directing element, said first, second, and third components being totally enclosed by said hollow member and closure means, and means for making electrical connections to said deflectable coil and said fixed coil from without said apparatus.

7. A galvanometer-type amplifier-modulator comprising a hollow cylindrical member of paramagnetic material provided with end closures of paramagnetic material, a pair of spaced solid cylindrical elements within said cylindrical member in axial alignment therewith and respectively abutting respective ones of said end closures, one of said cylindrical member and spaced element pair being magnetized to produce a steady axially-directed magnetic flux in the space between said element pair, first coil means supported in said space for motion to vary the amount of flux passing through said coil means, second coil means fixedly mounted within said member, said second coil means being so constructed and arranged that upon electrical energization thereof it superimposes a second magnetic flux on said steady magnetic flux according to said energization, and means for making electrical connections to said first and second coil means from without said apparatus.

References Cited in the file of this patent
UNITED STATES PATENTS

| | | |
|---|---|---|
| 2,486,641 | Gilbert | Nov. 1, 1949 |
| 2,671,886 | Smith | Mar. 9, 1954 |